US007990388B2

(12) United States Patent
Jones et al.

(10) Patent No.: US 7,990,388 B2
(45) Date of Patent: Aug. 2, 2011

(54) VERIFICATION OF ANIMATION IN A COMPUTING DEVICE

(75) Inventors: Tychaun Eric Grimes Jones, Bothell, WA (US); Pablo Candelas Gonzalez, Redmond, WA (US); Chen-Wen Lin, Kirkland, WA (US); Seana Seraji, Seattle, WA (US); William Suckow, Redmond, WA (US); Jonathan Vincent, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 12/023,049

(22) Filed: Jan. 31, 2008

(65) Prior Publication Data

US 2009/0195543 A1     Aug. 6, 2009

(51) Int. Cl.
*G06T 13/00* (2011.01)
(52) U.S. Cl. ........................... 345/473; 345/475
(58) Field of Classification Search .................. 345/473, 345/475
See application file for complete search history.

(56) References Cited

U.S. PATENT DOCUMENTS

| 5,687,307 | A | 11/1997 | Akisada |
| 5,867,175 | A | 2/1999 | Katzenberger |
| 5,946,002 | A | 8/1999 | Lowry |
| 6,208,357 | B1 | 3/2001 | Koga |
| 6,715,139 | B1 | 3/2004 | Kodosky |
| 6,904,561 | B1 | 6/2005 | Faraday |
| 7,197,710 | B2 | 3/2007 | Faraday |

OTHER PUBLICATIONS

Vander Veer, Emily A. "Chapter 13: Testing and Debugging." Flash 8: the Missing Manual. Sebastopol, CA: O'Reilly, 2006. 367-392.*
Fiaz Hussain, Essential Flash 5.0 Fast: Rapid Web Animation, http://books.google.com/books?id=PYKw1UwF3gYC&pg=PA157&lpg=PA157&dq=%22testing+an+animation%22&source=web&ots=tWcuFSDvmd&sig=MM6Ta82XeM1QGd2ySSgoYr21J9A, 2001, p. 157.
TS_60_MobilitySVGComponents, http://wiki.netbeans.info/wiki/viewTS_60_MobilitySVGComponents#section-TS_60_MobilitySVCComponents-TestSuiteSVCEditor Animation, printed Nov. 15, 2007.
Jae Y. Lee et al., Viewpoint's MTS Scene Builder User Guide, Version 3.0.2.58, http://www.7cai.com/web3d/viewpoint/download/VETSceneBuilder.pdf, 1999-2000.

* cited by examiner

*Primary Examiner* — Xiao M Wu
*Assistant Examiner* — Scott E Sonners
(74) *Attorney, Agent, or Firm* — Merchant & Gould P.C.

(57) ABSTRACT

Methods and systems of verifying an animation applied in a mobile device may include a timer module that is programmed to time-slice the animation into multiple scenes at predetermined time points along a timeline of the animation. A first capture module is programmed to capture actual data of each scene at each of the time points while the animation is running. A first comparison module is programmed to compare the actual data of each scene with expected data of the corresponding scene to determine whether the actual data of each scene matches the expected data of the corresponding scene. A first output module is programmed to generate a verification failure if the actual data of any scene does not match the expected data of the corresponding scene, and generate a verification success if the actual data of each scene matches the expected data of the corresponding scene.

18 Claims, 6 Drawing Sheets

VERIFICATION OF ANIMATION IN A COMPUTING DEVICE

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Mobile platforms are providing richer user experiences to their customers by off-loading the rendering of graphics to graphical processing units (GPUs). Examples of such graphics are animations that are used to provide a better transition between different elements in a graphical user interface. These animations can be more responsive and intuitive than an animated cursor.

For example, animations can typically be used to give applications a more life-like feel for the user. Everything from operating system components, like menus, to specialized applications can have animated components. The use of an animation for a better transition makes verification of the accuracy of the animation more important. In particular, the animation used in the transition needs to be verified and tested to determine if the animation meets design requirements during the transition.

SUMMARY

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

Embodiments described herein relate to systems and methods of verifying an animation.

As discussed herein, an aspect of some embodiments relates to a method of verifying an animation applied in a mobile device. The method includes time-slicing the animation into multiple scenes at predetermined time points along a timeline of the animation. The method also includes capturing actual data of each scene at each of the time points while the animation is running. The method further includes comparing the actual data of each scene with expected data of the corresponding scene to determine whether the actual data of each scene matches the expected data of the corresponding scene. The method includes generating a result indicating a verification failure if the actual data of any scene does not match the expected data of the corresponding scene. Finally, the method includes generating a result indicating a verification success if the actual data of each scene matches the expected data of the corresponding scene.

Another aspect of some embodiments relates to a system for verification of an animation applied in a mobile device. The system includes a timer module programmed to time-slice the animation into multiple scenes at predetermined time points along a timeline of the animation. The system also includes a first capture module programmed to capture actual data of each scene at each of the time points while the animation is running. The system includes a first comparison module programmed to compare the actual data of each scene with expected data of the corresponding scene to determine whether the actual data of each scene matches the expected data of the corresponding scene. The system further includes a first output module programmed to generate a verification failure if the actual data of any scene does not match the expected data of the corresponding scene, and generate a verification success if the actual data of each scene matches the expected data of the corresponding scene. In addition, the system includes a reconstruction module programmed to reconstruct the animation from the actual data captured. The system also includes a second capture module programmed to capture actual reconstructed data of each scene at each of the time points while the reconstructed animation is running. The system includes a second comparison module programmed to compare the actual reconstructed data of each scene with the actual data of the corresponding scene to determine whether the actual reconstructed data of each scene matches the actual data of the corresponding scene. Finally, the system includes a second output module programmed to generate a verification failure if the actual reconstructed data of any scene does not match the actual data of the corresponding scene, and generate a verification success if the actual reconstructed data of each scene matches the actual data of the corresponding scene and if the actual data of each scene matches the expected data of the corresponding scene.

Further aspects relate to a computer-readable storage medium having computer-executable instructions for performing steps comprising: time-slicing the animation into multiple scenes at predetermined time points along a timeline of the animation, capturing actual data of each scene at each of the time points while the animation is running, comparing the actual data of each scene with expected data of the corresponding scene to determine whether the actual data of each scene matches the expected data of the corresponding scene, generating a result indicating a verification failure if the actual data of any scene does not match the expected data of the corresponding scene, and generating a result indicating a verification success if the actual data of each scene matches the expected data of the corresponding scene.

DETAILED DESCRIPTION

This disclosure will now more fully describe example embodiments with reference to the accompanying drawings, in which specific embodiments are shown. Other aspects may, however, be embodied many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments described herein relate to systems and methods of verifying an animation.

Figure 1:
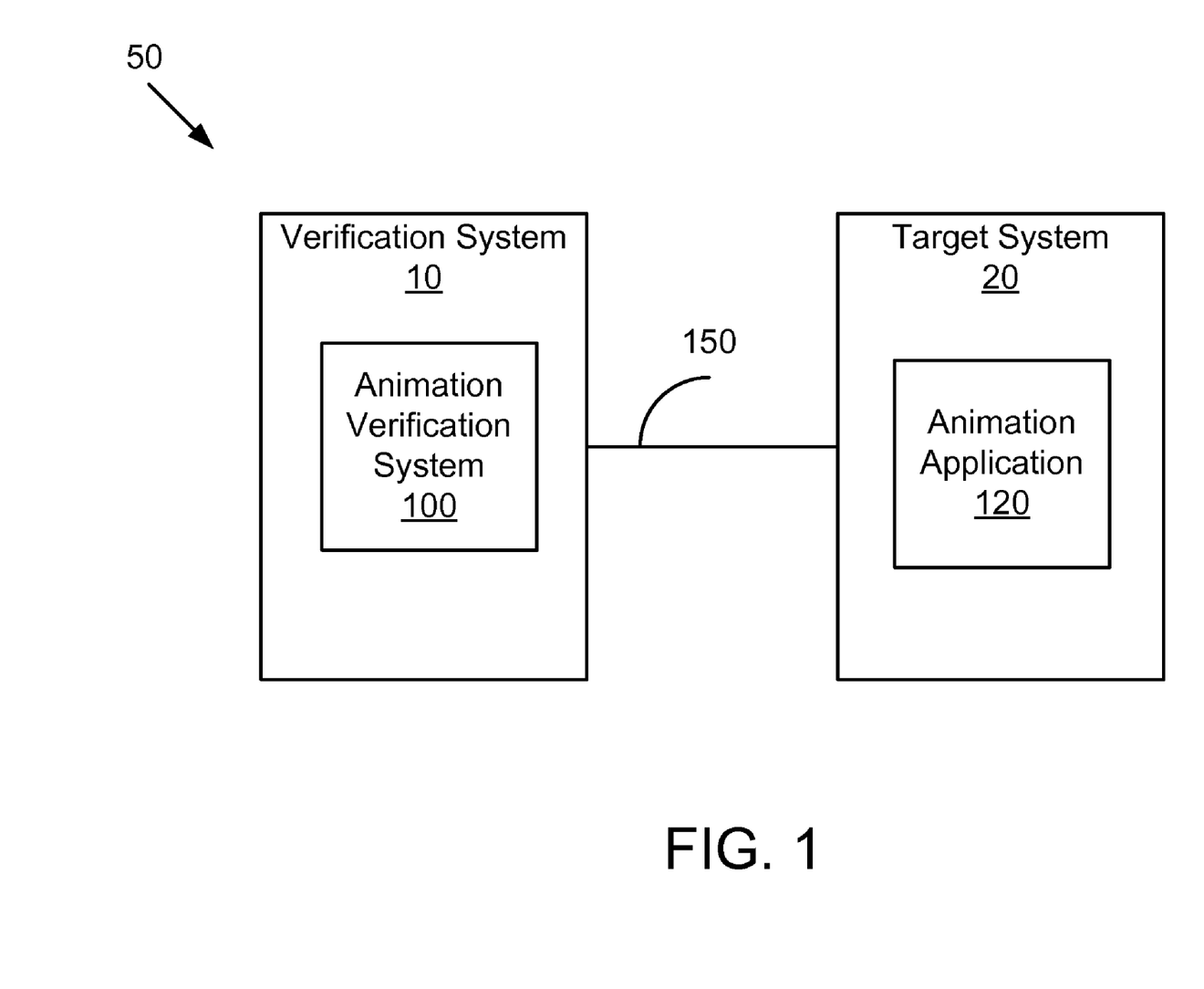
FIG. 1 is a block diagram of an example platform that includes a verification system and a target system.

FIG. 1 is a block diagram of an example platform 50 that may include a verification system 10 and a target system 20. The target system 20 may be any kind of products, services, or systems that needs to be evaluated to determine whether or not they meet design specifications and requirements.

In one possible embodiment, the target system 20 may be a mobile device such as a Personal Data Assistant (PDA) or mobile telephone. The mobile device typically includes a display screen for user output and a keyboard or touch screen for user input. The mobile device may also include various software systems and applications. For example, the mobile device may include MICROSOFT® WINDOWS MOBILE® operating system software, as well as a suite of applications for mobile devices.

The verification system 10 may be configured to verify and test the target system 20. Namely, the verification system 10 may evaluate whether or not the target system 20 meets the design specifications and requirements imposed on the target system 20. The platform 50 may also include an interface 150 between the verification system 10 and the target system 20. The verification system 10 may utilize the interface 150 to communicate between the target system 20 and the verification system 10. The verification system 10 may access and obtain data and information from the target system 20 for verification. The verification system 10 may also use the interface 150 to display and output a verification result.

Alternatively, the platform 50 may include more than one target system 20 to be verified by the verification system 10. In other words, the verification system 10 may perform verification for more than one target system 20. In addition, the platform 50 may also include more than one verification system 10. The multiple verification systems 10 may provide verifications for the one or more target systems 20 in different views and perspectives so that they may increase verification accuracy and meet various needs for verification.

The target system 20 may have various functional modules and applications including an animation application 120. In one possible embodiment, the animation application 120 may be an application running in the MICROSOFT® WINDOWS MOBILE® operating system environment. The animation application 120 may be configured to perform a rapid display of a sequence of images of two-dimensional artwork or model positions in order to create an illusion of movement. Generally, an animation is an optical illusion of motion due to the phenomenon of persistence of vision, and can be created and demonstrated in a number of ways. The most common method of presenting animation is as a motion picture or video program, although several other forms of presenting animation also exist.

In addition, the animation application 120 may be configured to render images from a model which is a description of three dimensional objects in a pre-defined language or data structure. The images may contain geometry, viewpoint, texture, lighting, shading information, etc.

In examples described herein, the animation application 120 in the target system 20 may be configured to display an electronic book. The animation application 120 may be programmed to animate a page flip of the electronic book as a user reads.

The verification system 10 may include an animation verification system 100. The verification system 100 may also utilize the interface 150 to communicate between the animation application 120 and the animation verification system 100. The animation verification system 100 may access and obtain data and information from the animation application 120 for verification. The animation verification system 100 may also use the interface 150 to display and output a verification result.

The animation verification system 100 may be programmed to time-slice an animation generated in the animation application 120 into multiple scenes at predetermined time points along a timeline of the animation. The animation verification system 100 may be programmed to capture actual data of each scene at each of the time points while the animation is running in the animation application 120. In addition, the animation verification system 100 may be programmed to compare the actual data of each scene with expected data of the corresponding scene to determine whether the actual data of each scene matches the expected data of the corresponding scene. Finally, the animation verification system 100 may be programmed to generate a verification failure if the actual data of any scene does not match the expected data of the corresponding scene, and generate a verification success if the actual data of each scene matches the expected data of the corresponding scene.

Figure 2:
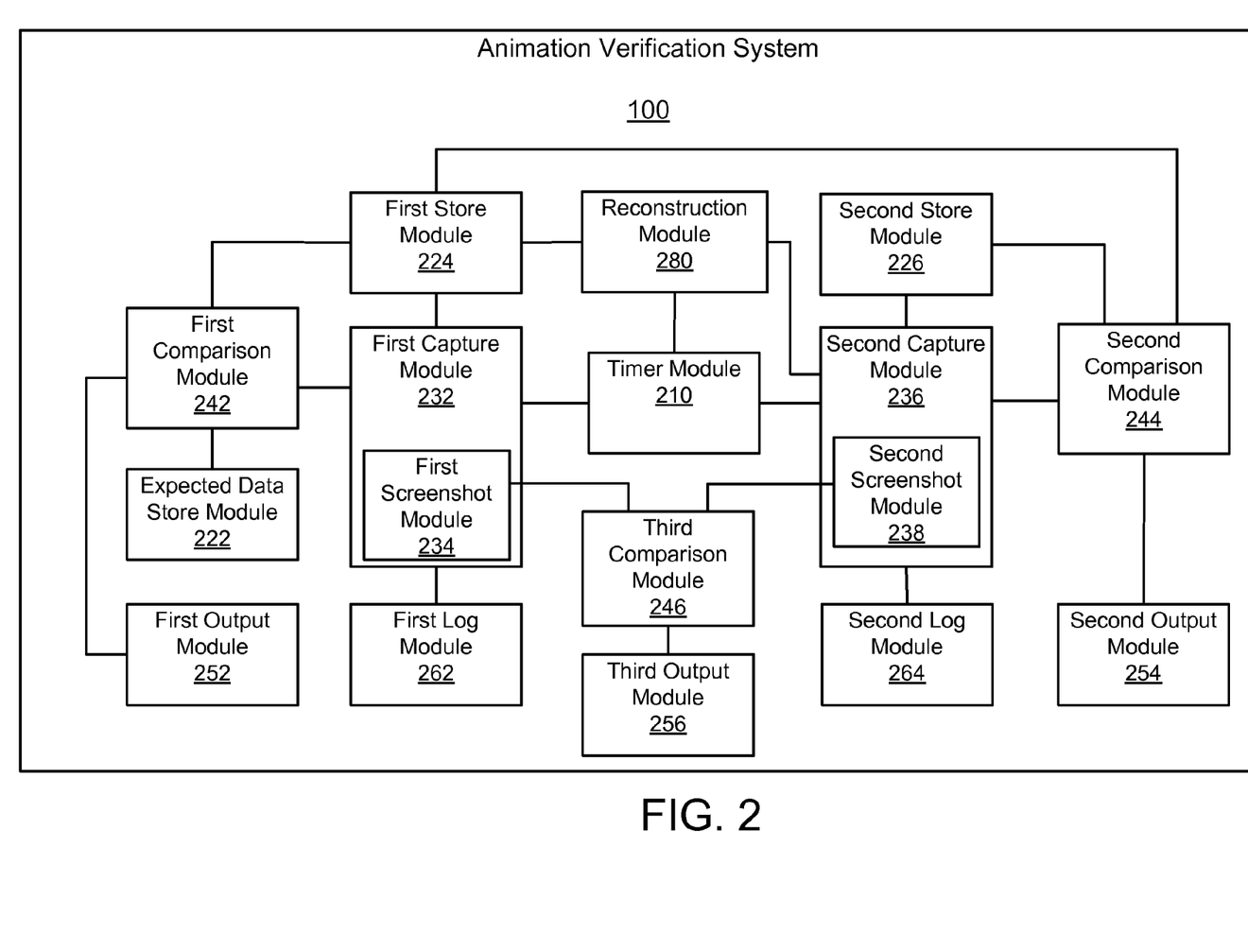
FIG. 2 is a block diagram illustrating the example animation verification system of FIG. 1.

FIG. 2 is a block diagram illustrating example operating modules of the animation verification system 100 of FIG. 1. The animation verification system 100 may include a timer module 210, a first capture module 232, a first comparison module 242 and a first output module 252.

The timer module 210 may be programmed to time-slice an animation into multiple scenes at predetermined time points along a timeline of the animation. In particular, the timer module 210 may be programmed to advance time along the timeline of the animation when an animation starts. The timer module 210 may also be programmed to time-slice the animation at the predetermined time points which include a start time point and an end time point. In one possible embodiment, the start time point may indicate a time point when the animation starts and the end time point may indicate a time point when the animation ends. In another possible embodiment, for an animation having indefinite duration and repeating in a looped fashion, the start time may indicate a time point when a loop of the animation starts. Accordingly, the end time point may indicate a time point when the loop ends. In this embodiment, the start and end times may typically be staged to cover exactly one entire "loop". In yet another possible embodiment, the start and end times may be selected arbitrarily. In other words, the start and end times may be selected at any time points during an animation period.

The predetermined time points may include one or more intermittent time points between the start time point and the end time point. Typically, the intermittent time points are evenly allocated between the start time point and the end time point along the timeline of the animation. For example, if the animation (or animation loop) completion time is T, the animation may be time-sliced into a start time point at $T0=0$, first, second and third intermittent time points at $T1=0.25*T$, $T2=0.5*T$, and $T3=0.75*T$ respectively, and an end time point at $T4=T$. In other examples, the animation may be broken into a plurality of time points that are approximately less than or equal to 100, 150, 200, or 250 milliseconds in duration. For some animations that are less than a second, the time points may typically be split into sections of less than or equal to 100 milliseconds, such as between 10-100 milliseconds. In another possible embodiment, the intermittent time points need not be allocated evenly between the start time point and the end time point. Other configurations are possible. In yet another possible embodiment, the predetermined time points may not include any intermittent time points.

The first capture module 232 may be programmed to capture actual data of each scene at each of the time points while the animation is running. The overall content and format of the data are discussed in more detail below in FIG. 3. When the first capture module 232 captures the actual data of each scene, the actual data may be stored in a first store module 224. In addition, a first log module 262 may be programmed to log the actual data so that a user may review and access the actual data of each scene. The user may utilize these accessible actual data to debug the animation as well. In one embodiment, the first log module 262 may directly obtain the actual data from the first capture module 232. In another possible embodiment, the first log module 262 may obtain the actual data from the first store module 224.

The first capture module 232 may include a first screenshot module 234 which is programmed to take a set of screenshots of the animation at each corresponding time point when the animation is running. The screenshots thus may have actual information and content of the animation at each corresponding time point.

The first comparison module 242 may be programmed to compare the actual data of each scene with expected data of the corresponding scene to determine whether the actual data of each scene matches the expected data of the corresponding scene. The expected data of each scene is pre-determined according to an animation design specification and requirement. In other words, the expected data reflects how an animation should be in each scene according to an intended design requirement. The expected data may be stored in an expected data store module 222 which is programmed to store the expected data of each scene. In one possible embodiment, the expected data store module 222 and the first store module 224 may be implemented in one store module (not shown) which is programmed to store both the expected data and the actual data.

The first comparison module 242 may directly obtain and access the actual data generated from the first capture module 232. Alternatively, the first comparison module 242 may access the actual data which is stored in the first store module 224.

Once the first comparison module 242 obtains the actual data, the first comparison module 242 may compare the actual data with the expected data to determine whether they match each other. The first comparison module 242 may then communicate a comparison result to the first output module 252 which is programmed to generate a result indicating verification failure if the actual data of any scene does not match the expected data of the corresponding scene. The result indicating verification failure can be a text message, a warning sound, or any other suitable information indicating a verification failure. The verification failure indicates that the animation does not meet the design specification and requirement of the animation. The first output module 252 may also generate a verification success if the actual data of each scene matches the expected data of the corresponding scene.

Moreover, the animation verification system 100 may include a reconstruction module 280 which is programmed to reconstruct the animation from the actual data captured. In particular, after the actual data is captured and obtained from the first capture module 232, the reconstruction module 280 may reconstruct the animation sequence from the actual data captured at each time point. Typically, the reconstruction module 280 may perform the reconstruction of the animation when the first output module 252 indicates a verification success. In other words, the reconstruction is performed after the first comparison module 242 indicates the actual data matches the expected data of each scene.

The animation verification system 100 may also include a second capture module 236 which is programmed to capture actual reconstructed data of each scene at each of the time points while the reconstructed animation is running. After the second capture module 236 captures the actual reconstructed data of each scene, the actual reconstructed data may be stored in a second store module 226. In addition, a second log module 264 may be programmed to log the actual reconstructed data so that a user can review and access the actual reconstructed data. In one possible embodiment, the second log module 264 may directly obtain the actual reconstructed data from the second capture module 236. In another possible embodiment, the second log module 264 may obtain the actual reconstructed data from the second store module 226.

The second capture module 236 may include a second screenshot module 238 which is programmed to take a set of screenshots of the reconstructed animation at each corresponding time point. The screenshots may thus have actual reconstructed information and content of the animation at each corresponding time point.

The animation verification system 100 may further include a second comparison module 244 which is programmed to compare the actual reconstructed data of each scene with the actual data of the corresponding scene to determine whether the actual reconstructed data of each scene matches the actual data of the corresponding scene. The actual data may be captured and obtained from the first capture module 232 when the animation is running. The actual reconstructed data may be captured and obtained through the second capture module 236 when the reconstructed animation is reconstructed. The actual reconstructed data may be stored in the second store module 226. In one possible embodiment, the first store module 224 and the second store module 226 may be implemented in one store module (not shown) which is programmed to store both the actual data and the actual reconstructed data.

The second comparison module 244 may directly access the actual reconstructed data from the second capture module 236. Alternatively, the second comparison module 244 may access the actual reconstructed data which is stored in the second store module 226.

Once the second comparison module 244 obtains the actual reconstructed data, the second comparison module 244 may then compare the actual reconstructed data with the actual data captured in the first capture module 232 to determine whether they match each other. Similar to the first comparison module 232, the second comparison module 244 then may communicate a comparison result to a second output module 254 which is programmed to generate a result indicating verification failure if the actual reconstructed data of any scene does not match the actual data of the corresponding scene. The result indicating verification failure may be a text message, a warning sound, or any other suitable information indicating a verification failure. The verification failure indicates that the animation does not meet the design specification and requirement of the animation. The second output module 254 may be programmed to generate a verification success if the actual reconstructed data of each scene matches the actual data of the corresponding scene and if the actual data of each scene matches the expected data of the corresponding scene.

The animation verification system 100 may also include a third comparison module 246 which is programmed to compare the set of screenshots taken by the second screenshot module 238 with the set of screenshots taken in the first screenshot module 234 to determine whether the actual reconstructed data of each scene matches the actual data of the corresponding scene. In one possible embodiment, the comparison between the first and second sets of screenshots may typically be performed programmatically and automatically.

The animation verification system 100 may further include a third output module 256 which is programmed to output the comparison result in the third comparison module 246. In other words, if the first set of the screenshots of the first screenshot module 234 do not match the second set of the screenshots of the second screenshot module 238, the third output module generates a result indicating a verification failure. On the other hand, if the first set of screenshots captured in the first screenshot module 234 match the second set of the screenshots captured in the second module 238, the third output module 246 generates a result indicating a verification success.

In one possible embodiment, the first and second capture modules 232, 236 may be implemented in one capture module. In another possible embodiment, the first and second modules 232, 236 may be implemented in a separate module. Similarly, in one possible embodiment, the first and second screenshot modules 234, 238 may be implemented in one screenshot module. In another possible embodiment, the first and second screenshot modules 234, 238 may be implemented in a separate module.

In addition, in one possible embodiment, the first and second log modules 262, 264 may be implemented in one single log module. In another possible embodiment, the first and second log modules 262, 264 may be implemented separately.

As for the first, second and third comparison modules 242, 244, 246, in one possible embodiment, they may be implemented in one single comparison module. In another possible embodiment, the first, second and third comparison modules 242, 244, 246 may be implemented in individual modules or in any combination of one or two modules. Similarly, in one possible embodiment, the first, second and third output modules 252, 254, 256 may be implemented in one output module. In another possible embodiment, the first, second and third output modules 252, 254, 256 may be implemented in each individual module respectively or in any combination of the one or two modules.

Figure 3:
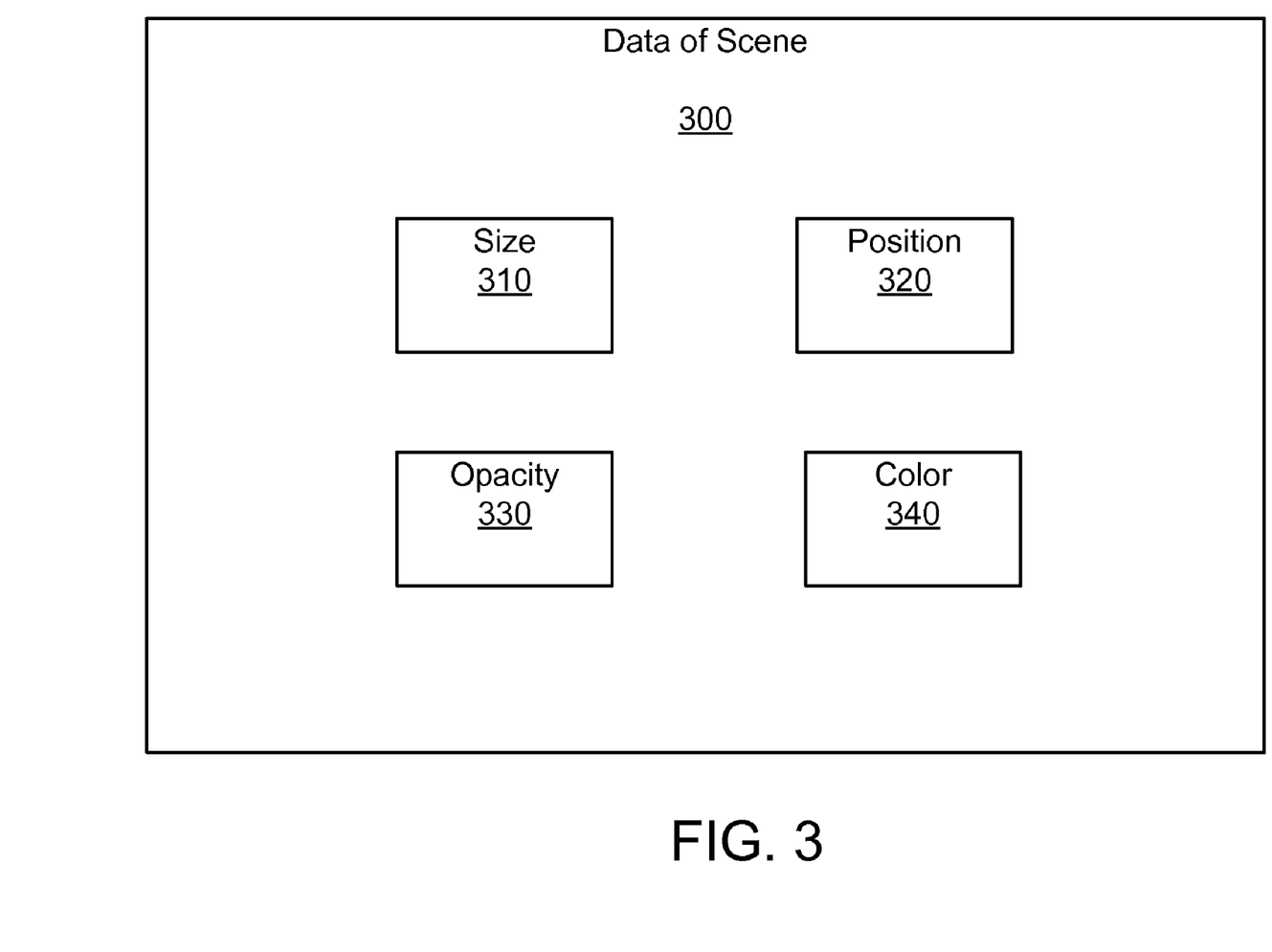
FIG. 3 is a block diagram illustrating overall content and format of scene data in an animation.

FIG. 3 is a block diagram illustrating overall content and format of scene data 300 in an animation. The expected data, the actual data, and the actual reconstructed data discussed above in FIG. 2 can have the overall content and format of scene data 300. Typically, the relevant attributes of the scene data 300 may include size 310, position 320, opacity 330, and color 340. The scene data 300 may also include other attributes for the scene such as shading, translucency, reflection and diffraction.

The scene data 300 may be stored in any suitable format or data structure for the animation. In one possible embodiment, the format of the scene data 300 may be stored in an Extensible Markup Language (XML) format. An example XML file is shown below.

```
<Canvas>
    <Image Name="Background" Width="240" Height="320"
        Canvas.Left="0"
    Canvas.Top="0" Source="WhiteBackground.PNG" />
        <Canvas Name="Canvas1" Canvas.Left="0" Width="100"
            Height="120">
            <Storyboard Name="TestAnimationOnCanvas">
                <DoubleAnimation Name="DoubleAnimationFromTo"
                    Storyboard.TargetName="Canvas1"
                    Storyboard.TargetProperty="(Canvas.Left)"
```

-continued

```
                    From="10"
                    To="200"
                    Duration="10"
                />
                <DoubleAnimation Name="DoubleAnimationTo"
                    Storyboard.TargetName="Canvas1"
                    Storyboard.TargetProperty="(Canvas.Top)"
                    To="60"
                    Duration="0.5"
                />
                <DoubleAnimation Name="DoubleAnimationOpacity"
                    Storyboard.TargetName="Canvas1"
                    Storyboard.TargetProperty="(UIElement.Opacity)"
                    From="0.5"
                    Duration="2"
                    BeginTime="2"
                />
            </Storyboard>
            <TextBlock Name="TextBlock1"
                FontFamily="Segoe"
                FontSize="11"
                Width="100"
                Height="20"
                TextTrimming="CharacterEllipsis"> Testing
                Testing</TextBlock>
        </Canvas>
    </Canvas>
```

The example XML file shown above describes a scene with text "Testing Testing" on a canvas. The canvas does the following animations: (1) the canvas moves left from 10 to 100 in 10 seconds starting from t=0; (2) the canvas moves down from 0 to 60 in 0.5 seconds starting from t=0; and (3) the canvas becomes semi-transparent for 2 seconds starting from t=2.

Figure 4:
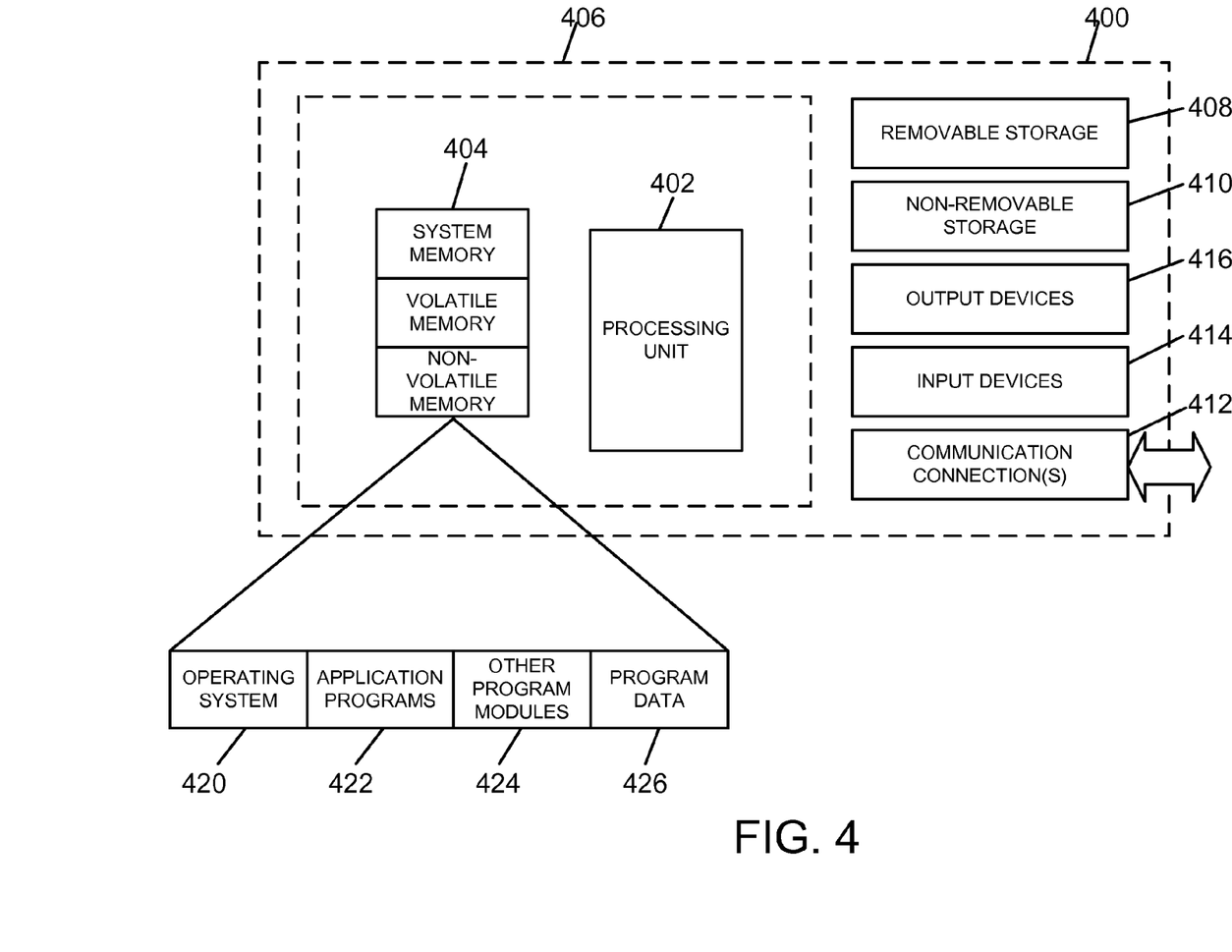
FIG. 4 is an example computing system for implementing aspects of the present disclosure.

FIG. 4 is an example computing system 400 for implementing aspects of the present disclosure. For example, computing system 400 include the animation verification system 100 as discussed above that is used to verify an animation application 120 in FIG. 1. Computing system 400 can also include the animation verification system 100 as discussed above in FIG. 2.

In its most basic configuration, computing system 400 typically includes at least one processing unit 402 and memory 404. Depending on the exact configuration and type of computing system, memory 404 may be volatile (such as RAM), non-volatile (such as ROM, flash memory, etc.) or some combination of the two. This most basic configuration is illustrated in FIG. 4 by dashed line 406. Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing system 400. Any such computer storage media may be part of computing system 400. For example, the expected data, actual data, and actual reconstructed data of each scene in the animation discussed above in FIGS. 1-3 can be stored in the memory 404.

Computing system 400 may also contain communications connection(s) 412 that allow the computing system to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

In some embodiments, memory 404 may include one or more of operating system 420, application programs 422, other program modules 424, and program data 426.

Figure 5:
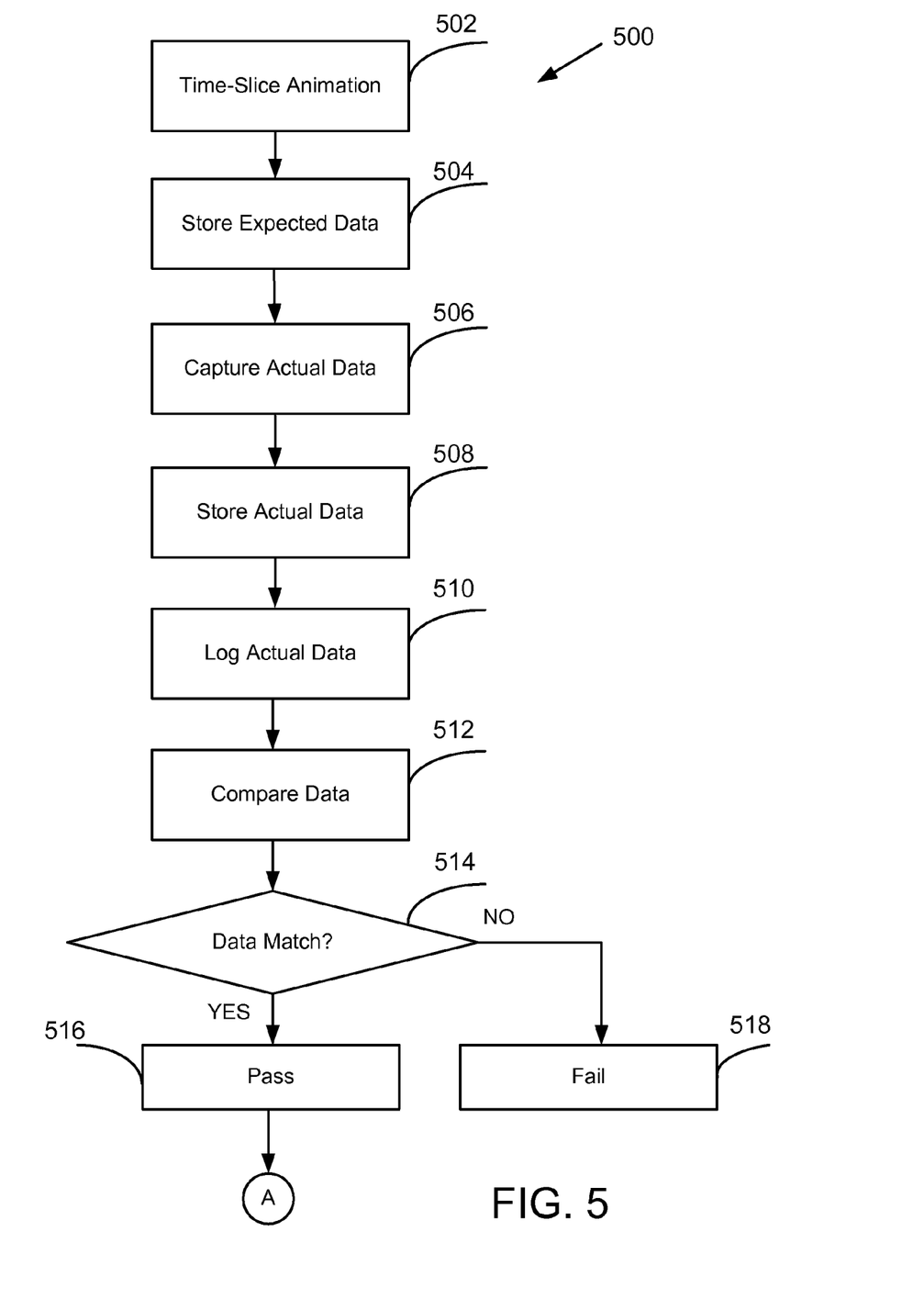
FIGS. 5 and 6 illustrate an example method of verifying an animation by an animation verification system.
Figure 6:
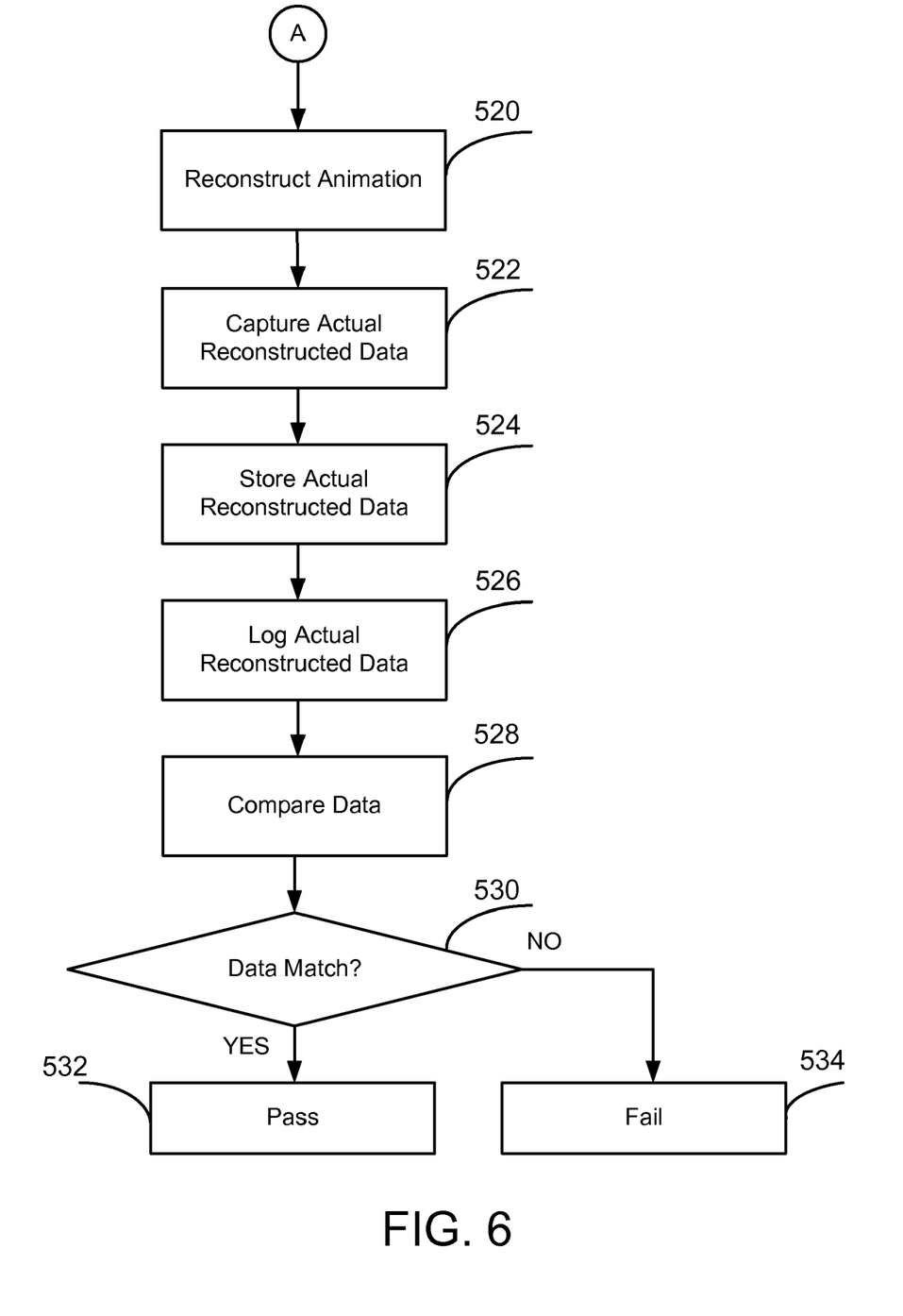

FIGS. 5 and 6 illustrate an example method 500 of verifying an animation by an animation verification system. A timer in the animation verification system is used to advance time along the timeline of the animation. At operation 502, the animation verification system time-slices the animation into multiple scenes at predetermined time points along the timeline of the animation. In particular, the predetermined time points may include a start time point and an end time point. The start time point may indicate a time point when the animation starts. The end time point may indicate a time point when the animation completes. The predetermined time points may include one or more intermittent time points between the start time point and the end time point. Typically, the intermittent time points are evenly allocated between the start time point and the end time point along the timeline of the animation.

Operational flow proceeds to operation 504. At operation 504, the animation verification system stores expected data of each scene which is pre-determined according to an animation design specification and requirement. The expected data of each scene may include size, position, opacity and color. The expected data may also include other attributes for the scene such as shading, translucency, reflection, diffraction, and so on. In one possible embodiment, the expected data are stored in an XML format. The scene data may also be stored in any other suitable format or data structure.

Operational flow proceeds to operation 506. At operation 506, the animation verification system captures actual data of each scene at each of the predetermined time points while the animation is running. The captured actual data has a corresponding content and format as the expected data of each scene. In other words, the animation verification system captures actual data of each scene in a same format as the expected data so that the animation verification system can compare and verify whether the actual data matches the expected data in each attribute and element of each scene. A user therefore is able to know which particular attribute or element of each scene is verified or not according to the design specification and requirement of each scene of the animation.

In addition, capturing the actual data may include taking screenshots of the animation at each corresponding time point when the animation is running.

Operational flow proceeds to operation 508. At operation 508, the animation verification system stores the actual data captured in operation 506. The actual data may be stored in an XML format. In another possible embodiment, the actual data may also be stored in any other suitable format or data structure.

Operational flow proceeds to operation 510. At operation 510, the animation verification system logs the actual data captured in the operation 506. In one possible embodiment, the animation verification system may log the information and content of the actual data at the same time while the data of each scene is captured. In another possible embodiment, the animation verification system may log the information and content of the actual data after the data of all scenes is captured. Logging the information of the actual data facilitates a user to quickly view and access the captured actual data. This convenient viewing and accessing helps the user to debug the animation application. The animation verification system may directly obtain the actual data when the animation verification system captures the actual data. In another possible embodiment, the animation verification system may obtain the actual data from a store module which stores the captured actual data.

Operational flow proceeds to operation 512. At operation 512, the animation verification system compares the actual data of each scene with the expected data of the corresponding scene to determine whether the actual data of each scene matches the expected data of the corresponding scene.

Operational flow proceeds to a comparison operation 514. The comparison operation 514 determines whether the actual data of each scene matches the expected data of the corresponding scene. If the comparison operation 514 determines that the actual data of any scene does not match the expected data of the corresponding scene, then operational flow branches "No" and operational flow proceeds to an operation 518. At the operation 518, the animation verification system generates a failure message which indicates the animation does not perform as expected from the design specification and requirement. For example, some rounding or algorithmic errors may cause a verification failure of the animation. A user such as a tester or developer may look into the captured data and the logged information to debug and analyze the animation application.

If the comparison operation 514 determines that the actual data of each scene matches the expected data of the corresponding scene, then operational flow branches "Yes" and operational flow proceeds to operation 516. At operation 516, the animation verification system generates a pass message to indicate that the actual data of each scene matches the expected data of the corresponding scene.

After operation 516, operational flow proceeds to operation 520. At operation 520, the animation verification system reconstructs the animation from the actual data captured in operation 506 after the animation is complete.

Operational flow proceeds to operation 522. At operation 522, the animation verification system captures actual reconstructed data of each scene at each of the time points while the reconstructed animation is running. In one possible embodiment, capturing actual reconstructed data of each scene may include taking screenshots of the reconstructed animation at each corresponding time point.

Operational flow proceeds to operation 524. At operation 524, the animation verification system stores the reconstructed actual data captured in the operation 522. The actual reconstructed data may be stored in an XML format. In another possible embodiment, the actual reconstructed data may be stored in any other suitable format or data structure. Typically, the actual reconstructed data is stored in a same format with the actual data so that it is useful and sometimes necessary for doing comparison between the actual reconstructed data and the actual data.

Operational flow proceeds to operation 526. At operation 526, the animation verification system logs the information and content of the actual reconstructed data so that a user can view and access the information and data. In one possible embodiment, the animation verification system may directly obtain the actual reconstructed data from the operation 522. In another possible embodiment, the animation verification system may obtain the actual reconstructed data from the operation 524.

Operational flow proceeds to operation 528. At operation 528, the animation verification system compares the actual reconstructed data of each scene with the actual data of the corresponding scene to determine whether the actual reconstructed data of each scene matches the actual data of the corresponding scene. Comparing the actual reconstructed data of each scene with the actual data of the corresponding scene may include comparing the screenshots taken in the operation 522 with the screenshots taken in operation 506 to determine whether the actual reconstructed data of each scene matches the actual data of the corresponding scene. The comparison between the screenshots taken in the operation 522 and the operation 506 may typically be performed programmatically and automatically. In alternative embodiments, the comparison can be done manually.

Operational flow proceeds to a comparison operation 530. The comparison operation 530 determines whether the actual reconstructed data of each scene matches the actual data of the corresponding scene. If the comparison operation 530 determines that the actual reconstructed data of any scene does not match the actual data of the corresponding scene, then operational flow branches "No" and operational flow proceeds to an operation 534. At operation 534, the animation verification system generates a failure message which indicates that the animation does not perform as expected from the design specification and requirement. In other words, the animation may have rounding or algorithmic errors. In one possible embodiment, a file which contains the difference between the actual data in operation 506 and the reconstructed data in operation 522 may be saved for debugging purpose. The file may include images from the actual and reconstructed data. The file may be saved in a local storage memory for the user to access and use. The user may look into the captured data and logged information to debug and analyze the animation application.

If the comparison operation 530 determines that the actual reconstructed data of each scene matches the actual data of the corresponding scene, then operational flow branches "Yes" and operational flow proceeds to operation 532. At operation 532, the animation verification system may generate a pass message to indicate that the actual reconstructed data of each scene matches the actual data of the corresponding scene.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of verifying an animation applied in a mobile device, the method comprising:
    time-slicing the animation into multiple scenes at predetermined time points along a timeline of the animation;
    capturing actual data of each scene at each of the time points while the animation is running;
    comparing the actual data of each scene with expected data of the corresponding scene to determine whether the actual data of each scene matches the expected data of the corresponding scene;
    if the actual data of any scene does not match the expected data of the corresponding scene, generating a result indicating a verification failure;
    if the actual data of each scene matches the expected data of the corresponding scene, generating a result indicating a verification success;
    reconstructing the animation from the actual data captured;
    capturing actual reconstructed data of each scene at each of the time points while the reconstructed animation is running;
    comparing the actual reconstructed data of each scene with the actual data of the corresponding scene to determine whether the actual reconstructed data of each scene matches the actual data of the corresponding scene;
    if the actual reconstructed data of any scene does not match the actual data of the corresponding scene, generating a result indicating a verification failure; and
    if the actual reconstructed data of each scene matches the actual data of the corresponding scene and if the actual data of each scene matches the expected data of the corresponding scene, generating a result indicating a verification success.

2. The method of claim 1, further comprising:
    storing the expected data of each scene;
    storing the actual data of each scene;
    logging the actual data of each scene;
    storing the actual reconstructed data of each scene; and
    logging the actual reconstructed data of each scene.

3. The method of claim 1, wherein capturing actual data of each scene includes taking a first set of screenshots of the animation at each corresponding time point, and wherein capturing actual reconstructed data of each scene includes taking a second set of screenshots of the reconstructed animation at each corresponding time point.

4. The method of claim 3, wherein comparing the actual reconstructed data of each scene with the actual data of the corresponding scene includes comparing the second set of screenshots with the first set of screenshots to determine whether the actual reconstructed data of each scene matches the actual data of the corresponding scene.

5. The method of claim 1, wherein time-slicing the animation includes:
    selecting a start time point and an end time point, the start time point indicating a time point when the animation starts and the end time point indicating a time point when the animation ends; and
    selecting one or more intermittent time points between the start time point and the end time point, wherein the intermittent time points are evenly allocated between the start time point and the end time point along the timeline of the animation.

6. A system for verification of an animation applied in a mobile device, the system comprising:
    a timer module programmed to time-slice the animation into multiple scenes at predetermined time points along a timeline of the animation;

a first capture module programmed to capture actual data of each scene at each of the time points while the animation is running;

a first comparison module programmed to compare the actual data of each scene with expected data of the corresponding scene to determine whether the actual data of each scene matches the expected data of the corresponding scene;

a first output module programmed to generate a verification failure if the actual data of any scene does not match the expected data of the corresponding scene, and to generate a verification success if the actual data of each scene matches the expected data of the corresponding scene;

a reconstruction module programmed to reconstruct the animation from the actual data captured;

a second capture module programmed to capture actual reconstructed data of each scene at each of the time points while the reconstructed animation is running;

a second comparison module programmed to compare the actual reconstructed data of each scene with the actual data of the corresponding scene to determine whether the actual reconstructed data of each scene matches the actual data of the corresponding scene; and a second output module programmed to generate a verification failure if the actual reconstructed data of any scene does not match the actual data of the corresponding scene, and to generate a verification success if the actual reconstructed data of each scene matches the actual data of the corresponding scene and if the actual data of each scene matches the expected data of the corresponding scene.

7. The system of claim 6, wherein the expected data includes data corresponding to size, position, color and opacity for a plurality of elements in each scene.

8. The system of claim 6, further comprising:
a first store module programmed to store the actual data of each scene;
a first log module programmed to log the actual data of each scene;
a second store module programmed to store the actual reconstructed data of each scene; and
a second log module programmed to log the actual reconstructed data of each scene.

9. The system of claim 6, wherein the first capture module includes a first screenshot module programmed to take a first set of screenshots of the animation at each corresponding time point, and wherein the second capture module includes a second screenshot module programmed to take a second set of screenshots of the reconstructed animation at each corresponding time point.

10. The system of claim 9, wherein the second comparison module includes a third comparison module programmed to compare the second set of screenshots with the first set of screenshots to determine whether the actual reconstructed data of each scene matches the actual data of the corresponding scene.

11. The system of claim 6, wherein the predetermined time points include a start time point and an end time point, the start time point indicating a time point when the animation starts and the end time point indicating a time point when the animation ends.

12. The system of claim 11, wherein the predetermined time points include one or more intermittent time points between the start time point and the end time point.

13. The system of claim 12, wherein the intermittent time points are evenly allocated between the start time point and the end time point along the timeline of the animation.

14. A computer storage medium having computer-executable instructions for performing steps comprising:

time-slicing the animation into multiple scenes at predetermined time points along a timeline of the animation;

capturing actual data of each scene at each of the time points while the animation is running;

comparing the actual data of each scene with expected data of the corresponding scene to determine whether the actual data of each scene matches the expected data of the corresponding scene;

if the actual data of any scene does not match the expected data of the corresponding scene, generating a result indicating a verification failure;

if the actual data of each scene matches the expected data of the corresponding scene, generating a result indicating a verification success;

reconstructing the animation from the actual data captured;

capturing actual reconstructed data of each scene at each of the time points while the reconstructed animation is running;

comparing the actual reconstructed data of each scene with the actual data of the corresponding scene to determine whether the actual reconstructed data of each scene matches the actual data of the corresponding scene;

if the actual reconstructed data of any scene does not match the actual data of the corresponding scene, generating a result indicating a verification failure; and if the actual reconstructed data of each scene matches the actual data of the corresponding scene and if the actual data of each scene matches the expected data of the corresponding scene, generating a result indicating a verification success.

15. The computer storage medium of claim 14, further comprising:
storing the expected data of each scene;
storing the actual data of each scene;
logging the actual data of each scene;
storing the actual reconstructed data of each scene; and
logging the actual reconstructed data of each scene.

16. The computer storage medium of claim 14, wherein capturing actual data of each scene includes taking a first set of screenshots of the animation at each corresponding time point, and wherein capturing actual reconstructed data of each scene includes taking a second set of screenshots of the reconstructed animation at each corresponding time point.

17. The computer storage medium of claim 16, wherein comparing the actual reconstructed data of each scene with the actual data of the corresponding scene includes comparing the second set of screenshots with the first set of screenshots to determine whether the actual reconstructed data of each scene matches the actual data of the corresponding scene.

18. The computer storage medium of claim 14, wherein time-slicing the animation includes:
selecting a start time point and an end time point, the start time point indicating a time point when the animation starts and the end time point indicating a time point when the animation ends; and
selecting one or more intermittent time points between the start time point and the end time point, wherein the intermittent time points are evenly allocated between the start time point and the end time point along the timeline of the animation.

* * * * *